United States Patent
Mak (10) Patent No.: US 6,205,255 B1
(45) Date of Patent: *Mar. 20, 2001

(54) METHOD AND APPARATUS FOR RUN-LENGTH ENCODING OF MULTI-COLORED IMAGES

(75) Inventor: Ping-Hang Henry Mak, Tempe, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/002,872

(22) Filed: Jan. 6, 1998

(51) Int. Cl.$^7$ ........................................................ G06K 9/46
(52) U.S. Cl. ...................... 382/245; 382/166; 358/261.1
(58) Field of Search ..................................... 382/245, 166, 382/162, 244–246, 254; 341/59, 65, 67; 358/261.1, 427, 501, 512; 345/150, 133; 375/240.01, 240.23

(56) References Cited

U.S. PATENT DOCUMENTS

| 4,418,406 | * | 11/1983 | Ogawa | 369/124 |
| 4,646,356 | * | 2/1987 | Anderson et al. | 382/245 |
| 4,847,677 | * | 7/1989 | Music et al. | 375/240.01 |
| 5,220,568 | * | 6/1993 | Howe et al. | 714/782 |
| 5,463,701 | * | 10/1995 | Kantner, Jr. et al. | 382/166 |
| 5,625,644 | * | 4/1997 | Myers | 375/242 |
| 5,768,569 | * | 6/1998 | Hoddie et al. | 345/501 |
| 5,778,103 | * | 7/1998 | Allan et al. | 382/254 |
| 5,907,330 | * | 5/1999 | Simmers | 345/512 |
| 5,915,077 | * | 6/1999 | Kulkarni et al. | 395/1.9 |
| 5,979,763 | * | 11/1999 | Wang et al. | 235/462.17 |

FOREIGN PATENT DOCUMENTS

89/01727 * 2/1989 (WO) .............................. H04N/1/413

* cited by examiner

*Primary Examiner*—Bhavesh Mehta
*Assistant Examiner*—Ishrat S. Herali
(74) *Attorney, Agent, or Firm*—Blakely, Sokoloff, Taylor & Zafman LLP (57) ABSTRACT

What is disclosed is a method for run-length encoding of a multi-colored image having the steps of first receiving a first color value, a second color value, and a third color value. Then, comparing a current color value with the third color value; and comparing the third color value with the first color value. If the current color value is not equal to the third color value, then capturing a run length and a run color value; and, if the third pixel value is equal to the first pixel value, then generating a codeword with the run length and the run color value. An apparatus for performing the above steps are also disclosed.

10 Claims, 7 Drawing Sheets

DECODE ( IN THE MIDDLE OF A ROW)

FIG. 7
DECODE (BETWEEN ROWS)
[DEFAULT PRR0=0, DEFAULT PRR1=2]

METHOD AND APPARATUS FOR RUN-LENGTH ENCODING OF MULTI-COLORED IMAGES

BACKGROUND

1. Field of the Invention

The invention relates to the field of use of compressing and decompressing of multi-colored images. In particular, the invention provides an enhanced version of run-length encoding (RLE).

2. Description of Related Art

In many low power, low cost embedded applications, there needs to be cost-effective ways to lower system power in systems which include a display. To lower system power consumption, the data in the display buffer of the system, which, for example, is contained in dynamic random access memory (DRAM), can be compressed, allowing the data to be stored on a small local buffer more often and thus making it possible for external memory to be powered down more often. System performance will also be increased by freeing up the external data bus for accesses by the processor or other peripherals as there is less data which has to be transferred over the data bus as the local buffer will often be able to store the data for an image.

Run-length encoding (RLE) is an efficient way to compress multicolored image buffers losslessly in hardware. The basic idea of RLE is to encode a "run" of pixels as a codeword with a run-length field and a pixel value (color) field. A run is defined as a stream of pixels of the same value within a row. A pixel whose pixel value (color) differs from its left and right neighbors is said to have a run length of 1. These type of pixels are known as singleton pixels.

There are many variants of this basic RLE scheme. For example, a code type field can be added and different encoding schemes can be tailored for runs of different characteristics to increase the compression ratio (e.g. short runs can be encoded in a shorter codeword than long runs; a series of runs of length 1 can be stored unencoded by preceding them with an escape code containing the number of the singleton pixels). But, for all these variants the basic idea is still to encode a run with a run-length/pixel value pair.

SUMMARY

What is disclosed is a method for run-length encoding of a multi-colored image having the steps of first receiving a first color value, a second color value, and a third color value. Then, comparing a current color value with the third color value; and comparing the third color value with the first color value. If the current color value is not equal to the third color value, then capturing a run length and a run color value; and, if the third pixel value is equal to the first pixel value, then generating a codeword with the run length and the run color value. A apparatus for performing the above steps are also disclosed.

DETAILED DESCRIPTION

The present invention provides a method and apparatus for performing run-length encoding of multi-colored images. For purposes of explanation, specific embodiments are set forth to provide a thorough understanding of the present invention. However, it will be understood by one skilled in the art, from reading this disclosure, that the invention may be practiced without these details. Further, although the present invention is described through the use of specific codewords for implementing a specific run-length encoding system, most, if not all, aspects of the invention apply to run-length encoding in general. Moreover, well-known elements, devices, process steps and the like are not set forth in detail in order to avoid obscuring the present invention.

To increase the compression of data in the image buffer, runs are encoded without the pixel value after the first two runs inside a region consisting of two alternating colors as the encoder keeps track both of the colors of the last two runs and of which of them was first encountered. Within the two color region, the color of every run beyond the second run is implicitly known to be the first encountered of the last two colors. To determine if the current run is part of the two color region, the encoder just needs to compare the color of the current run with the first encountered of the colors; if they are the same, only the count needs to be stored.

Correct decoding can be assured if the decoder also keeps track of the colors of the last two encountered runs and the first encountered of the two in the decompressed data stream, and the encoder and decoder both update the two colors after encoding/decoding. A new codeword type identifier is used to distinguish this codeword type from others.

Referring to Table 1, below, an example is shown where the shaded pixels can be encoded with this scheme. Each digit in the first row below represents the color of a pixel. The corresponding digit on the second row indicates the first encountered (as opposed to the most recently encountered) of the two stored colors at the time of encoding of the pixel. It can be seen that the first encountered color always matches the shaded pixel color.

TABLE 1

Application of Custom RLE Scheme

| 6 | 6 | 6 | 5 | 5 | 4 |  |  |  |  |  |  |  |  |  | 0 | 0 | 9 | 1 | 1 | 8 |  |  |  |
|---|---|---|---|---|---|---|---|---|---|---|---|---|---|---|---|---|---|---|---|---|---|---|---|
| ? | ? | ? | ? | ? | 6 | 5 | 5 | 5 | 4 | 4 | 4 | 5 | 4 | 4 | 4 | 4 | 5 | 5 | 4 | 0 | 0 | 9 | 1 | 1 | 8 | 8 | 8 |

Without the need to store the pixel value, one can encode data more efficiently. For instance, two short runs can be encoded in this special type of code word. Since a multi-colored image often contains many two color regions of medium length or short length runs, (e.g. text, two-colored icons or graphical objects), this invention can significantly increase the compression ratio in many cases.

Figure 1:
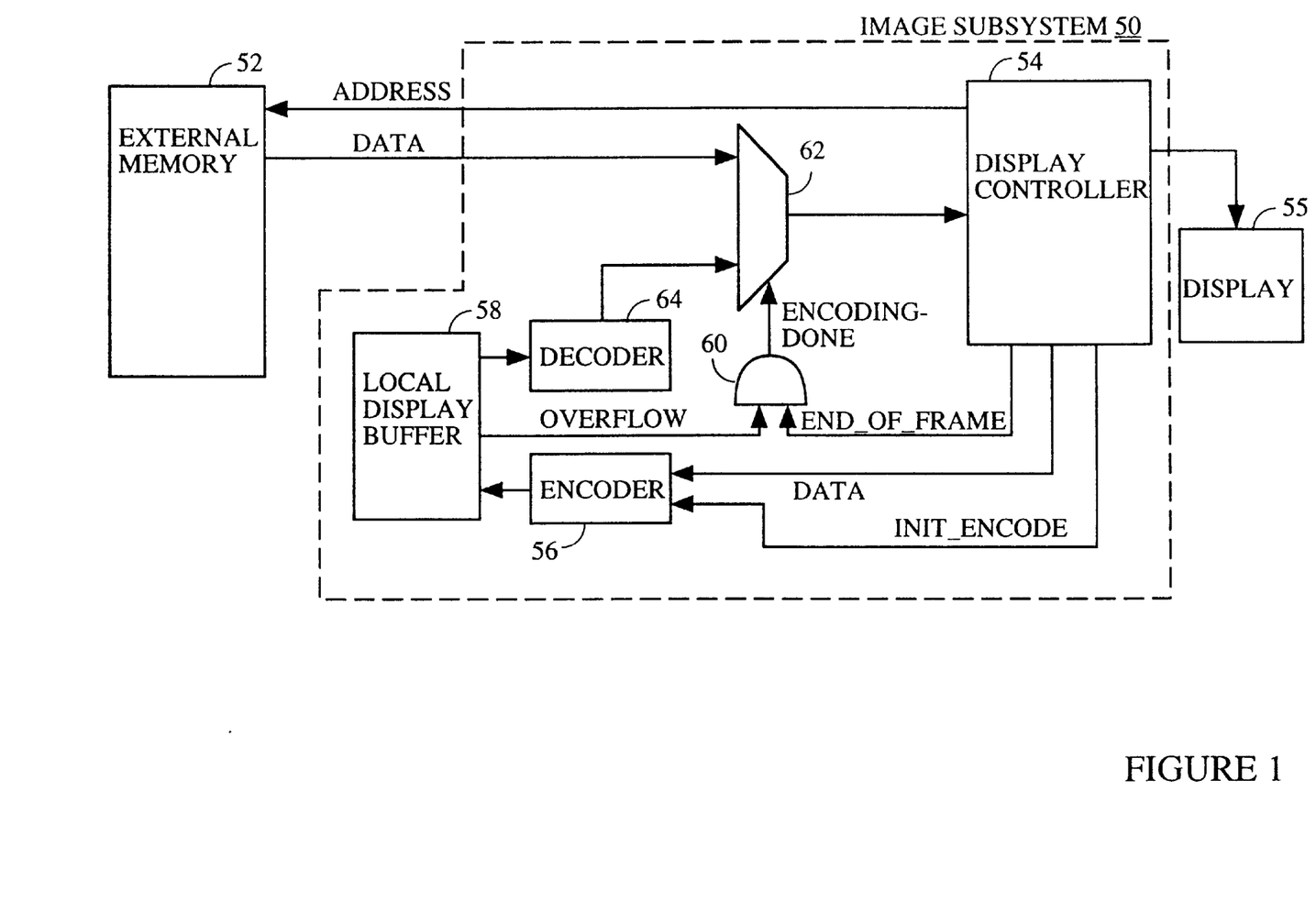
FIG. 1 is a block diagram of an image subsystem configured in accordance with one embodiment of the present invention.

FIG. 1 is a block diagram of an image subsystem 50 configured in accordance with one preferred embodiment of the present invention coupled to an external memory 52 and a display 55 to implement the RLE scheme.

Image subsystem 50 contains a display controller 54 which provides addresses external memory 52 to read out display data and format it for presentation on a display. Display controller 54 provides the received display data to an encoder 56 to compress and store into a local display buffer 58. Display controller 54 also provides a END_OF_FRAME signal to an AND-gate 60, which controls a multiplexor (MUX) 62 select from where display controller 54 receives display data, as explained below.

Connected to local display buffer 58 is a decoder 64 which decompresses and restores the compressed data in local display buffer 58. Decoder 64 provides the decoded information to MUX 62 to be passed on to display controller 54, as explained below.

Local display buffer 58 also has an OVERFLOW indicator that provides notification when the image being compressed is too large to be contained in local display buffer 58. If the local display buffer 58 is in an overflow situation, then local display buffer asserts the OVERFLOW indicator and forces display controller 54 to obtain display data from external memory 52 through the use of MUX 62.

Figure 2:
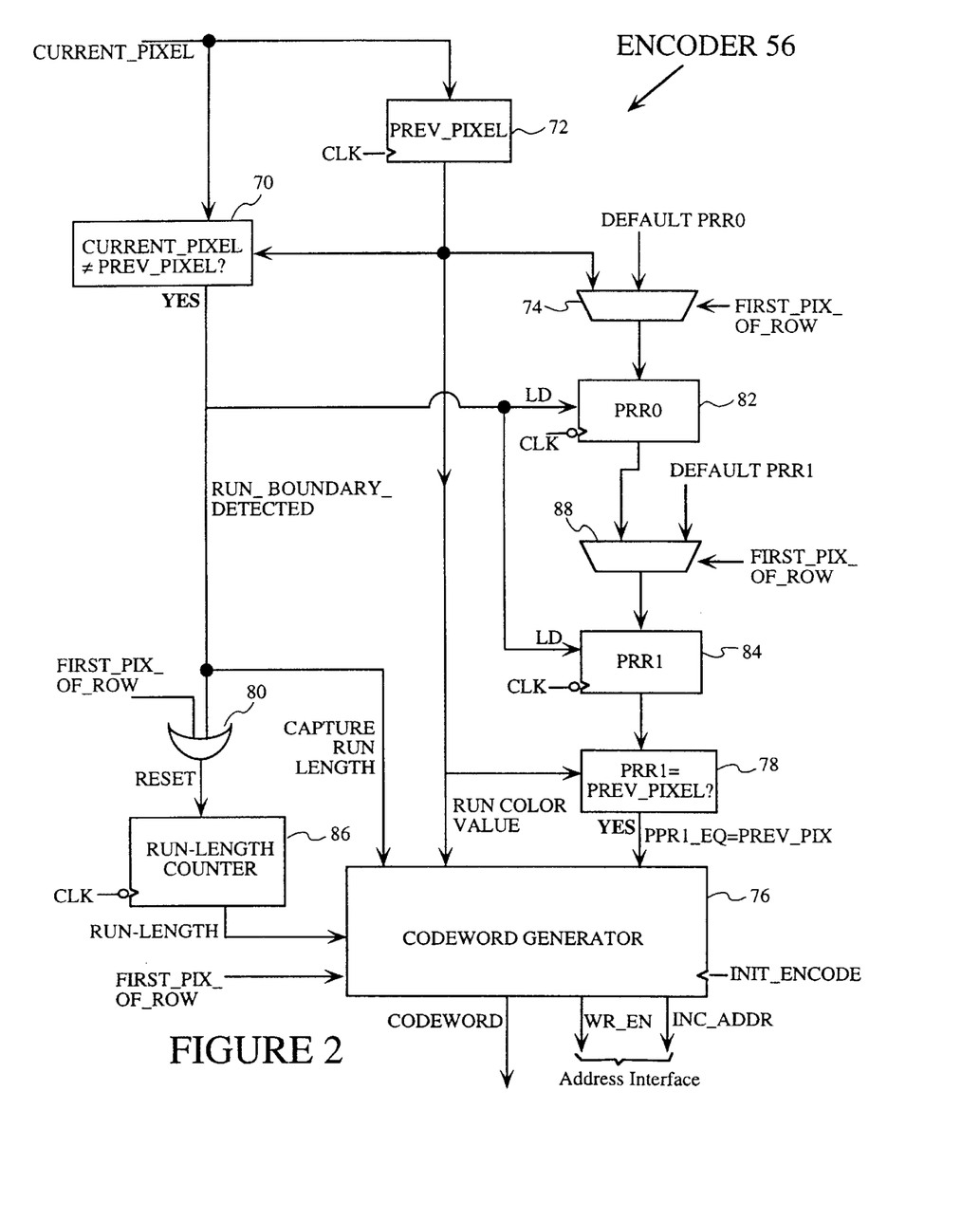
FIG. 2 is a block diagram of an encoder in the image subsystem configured in accordance with one embodiment of the present invention.

FIG. 2 is a block diagram of encoder 56 having a first comparator 70 which determines whether a color value for the current pixel (represented as CURRENT_PIXEL) that is received from display controller 54 is not equal to the color value of a previous pixel (represented as PREV_PIXEL). The output of first comparator 70 is a control signal which is fed into a run-length counter 86 via an OR-gate 80, a previous run register 0 (PRR0) latch 82, a previous run register 1 (PRR1) latch 84 and a codeword generator 76.

When first comparator 70 detects that CURRENT_PIXEL is not equal to PREV_PIXEL, the output of first comparator 70 is asserted, representing a run boundry (i.e., a change from one pixel value to a different pixel value) has been detected and sending a CAPTURE RUN LENGTH command to codeword generator 76, a RESET command to run-length counter 86, and a load (LD) command to PRR0 latch 82 and PRR1 latch 84.

PREV_PIXEL (i.e., the color value of the previous pixel), is stored by a first latch 72. First latch 72 will latch a new value during the falling edge of each received clock signal (CLK). The output of first latch 72 is not only fed into comparator 70, but is also sent to a first MUX 74, a second comparator 78 and codeword generator 76. The output of first latch 72 represents the color value of the current run (RUN COLOR VALUE).

Run-length counter 86 maintains a count of the run length of the present codeword and outputs a RUN-LENGTH to codeword generator 76. Run-length counter 86 provides the RUN-LENGTH to codeword generator 76 and increments its value during the falling edge of each clock cycle.

PRR0 latch 82 and PRR1 latch 84 loads a new value on the falling edge of each clock signal when there is a LD command from first comparator 70. The LD command is asserted by first comparator 70 when a run boundry is detected (i.e., when CURRENT_PIXEL is equal to PREV_PIXEL).

Second comparator 78 determines whether the output of PRR1 latch 84 is equal to the output of first latch 72. The output is asserted when the current run color matches that of the run before the last run (i.e., the current run is part of a two color region).

PRR0 latch 82 and PRR1 latch 84 receive the output of first MUX 74 and a second MUX 88, respectively. First MUX 74 is used to determine whether PRR0 latch 82 loads a default PRR0 (DEFAULT value or the output of first latch 72. Second MUX 88 is used to determine if PRR1 latch 84 loads a default PRR1 (DEFAULT PRR1) value or the output of PRR0 latch 82. First MUX 74 and second MUX 88 will select the default PRR0 and default PRR1 values, respectively, when a FIRST_PIX_OF_ROW command is asserted.

The FIRST_PIX_OF_ROW command is asserted by display controller 54 to indicate that the color value of CURRENT_PIXEL is for the first pixel of a particular row. FIRST_PIX_OF_ROW is povided to run-length counter 86 via OR-gate 80.

Codeword generator 76 is used to generate codewords with the input it receives from first comparator 70 (CAPTURE RUN LENGTH command), first latch 72 (RUN COLOR VALUE), run-length counter 86 (RUN-LENGTH value), second comparator 78 (PRR1_EQ=PREV_PIX), and display controller 54 (FIRST_PIX_OF_ROW) and INIT_ENCODE).

The output of codeword generator 76 includes a CODEWORD output, which is fed to local display buffer 58; a write enable (WR_EN) control signal, which sets local display buffer 58 into a state for writing CODEWORDs; and an increment address (INC_ADDR) control signal, which is sent local display buffer 58 to control the address where a CODEWORD is written. The WR_EN and INC_ADDR control signals are generally referred to as address interface signals.

Figure 3:
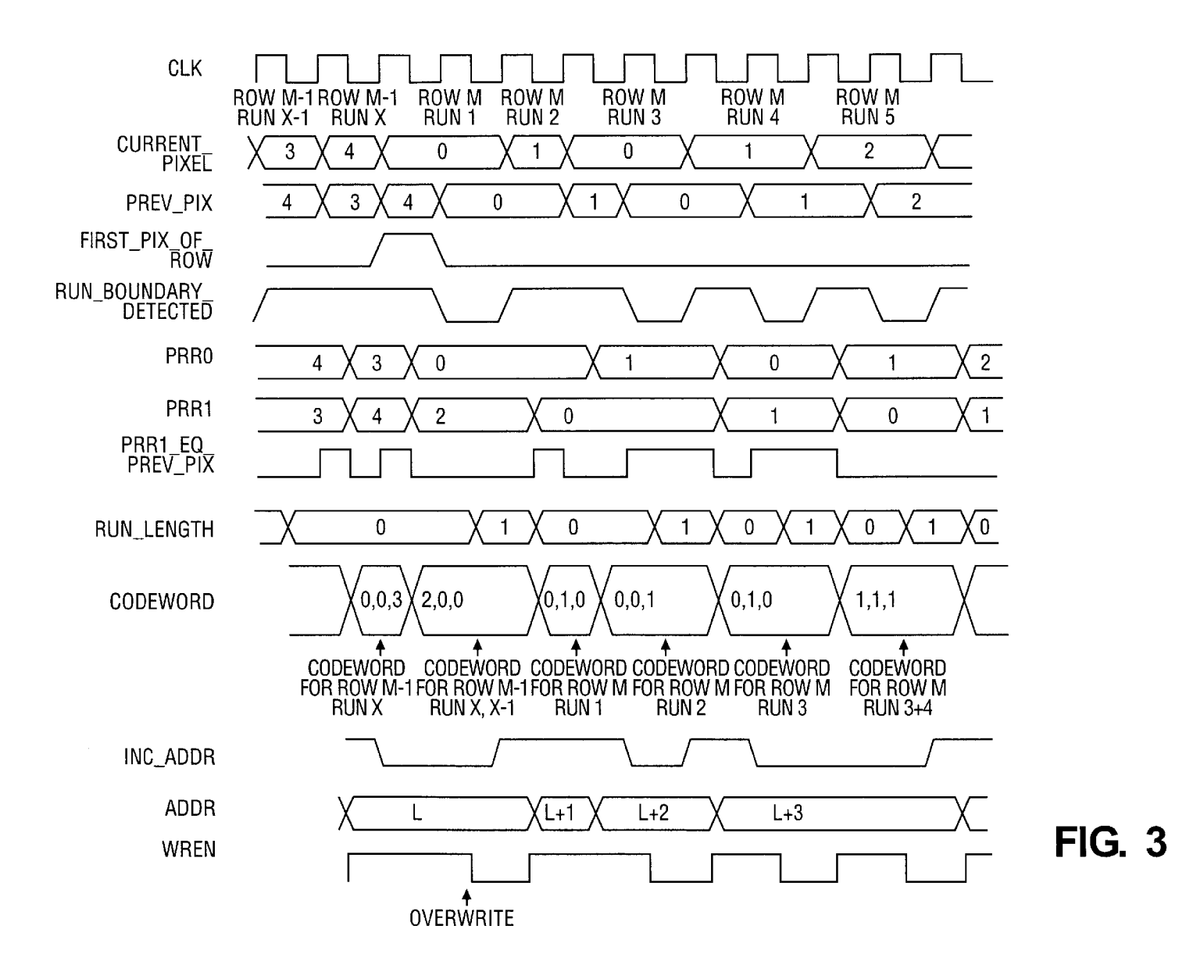
FIG. 3 is a timing diagram of the encoding process of an image according to one embodiment of the present invention when a beginning of a row is encountered.

FIG. 3 is a timing diagram of the encoding process where a transition occurs from a row M-1 of pixel values to a subsequent row M of pixel values. Specifically, encoder 56 is completing the processing of the pixel values of row M-1 and begins processing of the pixel values in row M. The labels on the left of FIG. 3 correspond to the signals and outputs as associated with and described for FIG. 2. For example, the waveform for RUN_BOUNDRY_DETECTED from FIG. 2 is the output from first comparator 70.

The clock (CLK) signal is a universal signal which is input to run-length counter 86, first latch 72, PRR0 latch 82, PRR1 latch 84. Each complete clock cycle consists of a rising edge and a falling edge.

CURRENT_PIXEL is the output received by encoder 56 from display controller 54. This stream of incoming pixel values from the output of display controller 54 is the stream of pixel data received from the reading of external memory 52 by display controller 54. Each pixel value in FIG. 3 is represented by a number, and each pixel value occupies one clock cycle. A run will consist of one or more clock cycles with the same pixel values. For example, for row M, the first run is for a pixel value of "0" with a length of two, which means that two sequential pixels have the same pixel value of "0." The third, fourth, and fifth runs of row M also have run lengths of two with pixel values of "0", "1", and "2", respectively. The second to last run and last run of row M-1 and second run of row M have run lengths of 1 and have pixel values of "3", "4", and "1", respectively. As seen in FIG. 3, the portion of the image that is being encoded is as follows:

. . . 3,4,0,0,1,0,0,1,1,2,2 . . .

where the pixel value of "3" is run X-1 of row M-1, the pixel value of "4" is run X of row M-1, the next two pixel values of "0"'s make up run 1 of row M, the next pixel values of "1" makes up run 2 of row M, the next pixel values of "0"'s make up run 3 of row M, and so forth. This is summarized in Table 2, below.

TABLE 2

Application of Custom RLE Scheme Between Rows

| ROW | M-1 | | M | | | | |
|---|---|---|---|---|---|---|---|
| RUN | X-1 | X | 1 | 2 | 3 | 4 | 5 |
| PIXELS | 3, | 4, | 0,0, | 1, | 0,0, | 1,1, | 2,2, |

Continuing with FIG. 3, PREV_PIXEL is the value that is stored in first latch 72. As discussed above, first latch 72 stores, or "flip/flops", the value of CURRENT_PIXEL on each clock cycle. Thus, during the next clock cycle, PREV_PIXEL will store the current pixel value on CURRENT_PIXEL.

FIRST_PIX_OF_ROW is asserted when the pixel value on CURRENT_PIXEL is the first pixel value for a new row. FIRST_PIX_OF_ROW is supplied by display controller 54. In FIG. 3, FIRST_PIX_OF_ROW is asserted during the clock cycle where CURRENT_PIXEL has the first pixel value of row M. Specifically, FIRST_PIX_OF_ROW is asserted as the first pixel value for row M appears on CURRENT_PIXEL, and de-asserted afterwards.

RUN_BOUNDRY_DETECTED is asserted whenever the pixel value on CURRENT_PIXEL is not equal to the pixel value of PREV_PIXEL. As stated above, RUN_BOUNDRY_DETECTED is the output of first comparator 70. A run boundry exists when CURRENT_PIXEL is not equal to PREV_PIXEL.

PRR0 and PRR1 are the values contained on PRR0 latch 82 and PRR1 latch 84. As noted above, PRR0 latch 82 and PRR1 latch 84 flip/flops the value on their inputs when RUN_BOUNDRY_DETECTED is asserted during the falling edge of each clock signal. If FIRST_PIX_OF ROW is not asserted, then PRR0 latch 82 and PRR1 latch 84 will latch the pixel value of PREV_PIXEL 72 and output of PRR0 latch 82, respectively, as first MUX 74 and second MUX 88 will pass through the output of first latch 72 and PRR0 latch 82, respectively. If FIRST_PIX_OF ROW is asserted, then first MUX 74 and second MUX 88 will pass through DEFAULT PRR0 and DEFAULT PRR1, respectively.

At the beginning of each row of image data, PRR0 latch 82 and PRR1 latch 84 is loaded with the default values DEFAULT PRR0 and DEFAULT PRR1, respectively. The specific values used for DEFAULT PRR0 and DEFAULT PRR1 can either be predetermined or determined for each image according to the characteristics of the image (i.e. what colors are the most common on the left of the image), as long as they stay the same during encoding and decoding.

For example, in FIG. 3, DEFAULT PRR0 and DEFAULT PRR1 have the values of 0 and 2, respectively. Thus, during the falling edge of the third clock cycle, PRR1 (i.e., the value in PRR1 latch 84) is equal to "2", which is the value of DEFAULT PRR1, as FIRST_PIX_OF_ROW causes second MUX 88 to pass through the DEFAULT PRR1 value, which in this case is "2". If FIRST_PIX_OF ROW is not asserted, as is the case during the first two clock cycles, PRR1 latch 84 stores the output of PRR0 latch 82. Thus, during the second clock cycle in FIG. 3, PRR1 latch 84 stores the value of "4", which is the output of PRR0 latch 82.

PRR1_EO_PREV_PIX is asserted when the value contained in PRR1 latch 84 is equal to the value contained in first latch 72. When PRR1_EO_PREV_PIX is asserted, the pixel value of the current run that is being encoded matches the pixel value of the run before the previous run (i.e., the pixel value of the current run is the same as the pixel value of two runs before). This indicates that that current run qualifies as the first run in the two color region to be encoded without a color field. If the current run qualifies as the first run in the two color region to be encoded, then codeword generator 76 will examine if the next run qualifies as the second run in the two color region to be encoded to ensure proper output and storage of special codewords.

CODEWORD is the output from codeword generator 76 and contains the RLE codewords which will be sent to local display buffer 58. In one embodiment, three types of codewords are used, each with a size that is either 8 or 16 bits. If possible, we will always try to use typed codeword to encode runs. The format of each is as follows:

Type 0: Used for runs of length 1–8

| 1 | run length (2:0) | pixel (3:0) |
|---|---|---|
| 7 | | 0 |

Type 1: Used for two consecutive runs, each of length 1–8, of 2 previously encountered pixels

| 0 | 0 | 1st run's run length (2:0) | 2nd run's run length (2:0) |
|---|---|---|---|
| 7 | | | 0 |

Type 2: Used for runs of length 9–512

| 0 | 1 | 1 | run length (8:0) | pixel (3:0) |
|---|---|---|---|---|
| 15 | | | | 0 |

<end>

For example, in FIG. 3, the codeword for run 1 of row M is (0,1,0), where the first "0" indicates that this is a codeword of type 0, the "1" indicates that the run (i.e., run 1) has a length of 2 (i.e., the run length is a binary value of 1, which translates to decimal value of 2), and the second "0" is the actual pixel value of the run (in decimal format). As another example, the codeword for run 2 of row M is (0,0,1), where the first "0" indicates that this codeword is a codeword of type 0, the second "0" indicates that the run length of run 2 is a length of 1, and the "1" represents the pixel value of the pixel in the run.

INC_ADDR is asserted when codeword generator 76 wishes to increment the address to be accessed in local display buffer 58. For every clock cycle that INC_ADDR is asserted, the address to be written to in local display buffer 58 is incremented by one or two address location depending on the codeword type used. As noted above, if the current run qualifies as the first run in the two color region to be encoded, then codeword generator 76 will examine if the next run qualifies as the second run in the two color region to be encoded before incrementing the address to be written to in local display buffer 58.

ADDR is the address location where the output of codeword generator 76 will be written. In FIG. 3, the codeword for the second to last run of row m-1 is written in a memory location "L." When INC_ADDR is asserted during the fifth clock cycle, ADDR will be incremented by one memory location to "L+1". In addition, as INC_ADDR remains asserted during the sixth clock cycle, ADDR will be again incremented by another memory location to "L+2".

WR_EN is a write enable signal which will cause local display buffer 58 to write the generated CODEWORD into a memory location of local display buffer 58 which is indicated by ADDR. For each clock cycle that WR_EN is enabled, local display buffer 58 will perform a write. It is to be noted that if ADDR is not incremented and WR_EN is asserted, an "overwrite" would exist, where a CODEWORD which has already been written would be overwritten by a new CODEWORD which is being written to the same ADDR location.

Figure 4:
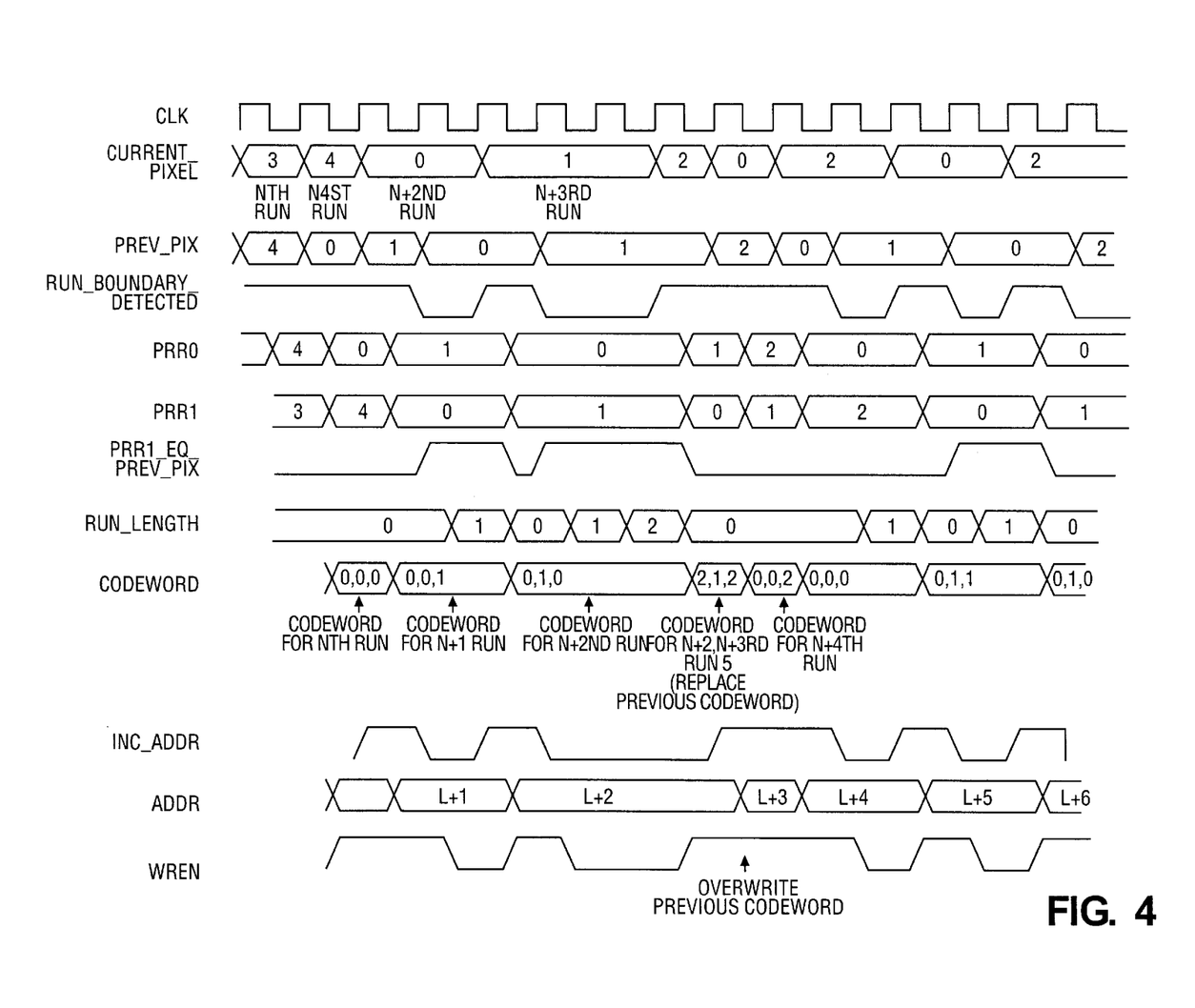
FIG. 4 is a timing diagram of the encoding process of an image according to one embodiment of the present invention during the middle of a row of the image.

FIG. 4 is a timing diagram of the encoding process during the encoding of a portion of a row of pixel values from an image. As seen in FIG. 4, the portion of the image that is being encoded is as follows:

. . . 0,1,0,0,1,1,1,2,0,1,1,0,0,2,2 . . .

where the first pixel value of "0" is run N, the second pixel value of "1" is run N+1, the next two pixel values of "0"'s make up run N+2, the next three pixel values of "1"'s make up run N+3, and so forth. This is summarized in Table 3, below.

TABLE 3

Application of Custom RLE Scheme In a Row

| RUN | N | N+1 | N+2 | N+3 | N+4 | N+5 | N+6 | N+7 | N+8 |
|---|---|---|---|---|---|---|---|---|---|
| PIXELS | 0, | 1, | 0,0, | 1,1,1, | 2, | 0, | 1,1, | 0,0, | 2,2, |

The encoding of the stream of pixel data in FIG. 4, is performed in the same manner as the stream of pixel data in FIG. 3. For example, the codeword for the N+2nd run is (0,1,0), where the first "0" value indicates that the codeword is a codeword of type 0, the "1" value indicates that the run length of the N+2nd run is two pixels, and the second "0" value is the value of the pixels in the run.

As discussed in FIG. 3, codeword generator 76 will generate a codeword for each run. However, when a two run sequence that is eligible for encoding using codeword type 0 is encountered, codeword generator 76 will overwrite the codeword generated for the first run in the eligible two run sequence with a special codeword generated for the first run and the second run. Thus, INC_ADDR will not be asserted and the address to where the next codeword will be written will remain the same as the address to where the previous codeword was written. When WR_EN is asserted, the codeword written out will overwrite, or replace, the codeword generated for the first run.

To explain it another way, at the end of a first run which matches the value of a second-to-last run, it is not yet known what the next run is going to be. Thus, codeword generator 76 must encode it in the "non-enhanced" 1-run-per codeword format and speculatively write it out to memory. If the second run is the same color as the second-to-last run, codeword generator 76 will re-encode both the first and second runs into a single code word and overwrite the speculatively written code word. Otherwise, the second run will be encoded as another code word, and will be written at the next address location.

For example, the sequence from run N+2 to run N+3, which is contained in the sequence from run N to run N+3, is a sequence which is eligible for encoding using the special codeword. Thus, even though codeword generator 76 will generate the codeword of (0,1,0) for the N+2 run to be written at memory location L+2 (as indicated by ADDR), codeword generator 76 will not assert INC_ADDR to increment the next write address for the next codeword when PRR1_EO_PREV_PIXEL is asserted. Therefore, when codeword generator 76 outputs the special codeword (1,1,2) for run N+2 and run N+3, the codeword for run N+2 will be overwritten.

The steps involved with generating a code word consists of receiving a first color value, a second color value, and a third color value. In one embodiment, the first, second and third color values are received in order, which means that the first color value is the one that has been in the system for the longest time, and the third color value is the most recently received. As discussed above, if the encoder is at the beginning of the row, then there are no previous or last previous run colors. Thus, for this situation, default color values are used for these color values as a substitute.

The process then continues with comparing a current color value with the third color value. This comparison determines if there is a color boundry that has been crossed. In one embodiment, the third color value is also compared with the first color value at approximately the same time if a color boundry has been crossed. In another embodiment, the third color value is compared to the first color value whether or not a color boundry has been crossed.

In addition, if the current color value is not equal to the third color value, which indicates that a color boundry has been crossed, then the run length and the run color value of the last run (which would be the third color value in this embodiment) is also captured. Run-length counter 86 would optionally be reset at this point. It is to be noted that if the a color boundry has not been crossed, then run-length counter 86 will be incremented.

If the third pixel value is equal to the first pixel value, which indicates that the the two run region is eligiable for encoding, then a codeword will be generated by codeword generator 76 with the run length and the run color value.

It is to be noted that although a specific circuit has been provided as an exmplary embodiment, the process described above can also be implemented in a general purpose processor or a custom designed application-specific integrated circuit (ASIC), with the program for encoding and decoding, as described below, stored in a memory.

Figure 5:
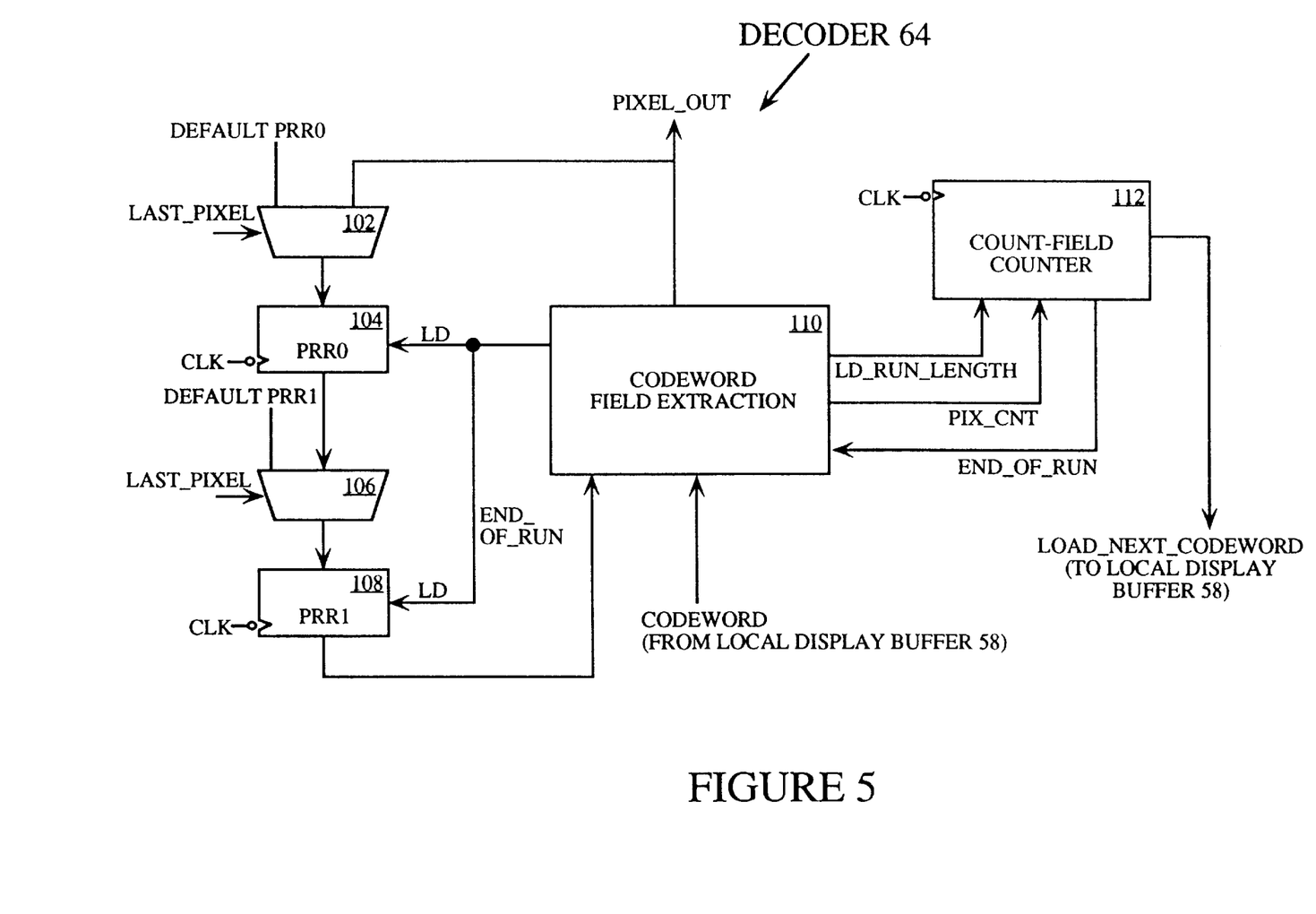
FIG. 5 is a block diagram of a decoder in the image subsystem configured in accordance with one embodiment of the present invention.

FIG. 5 is a block diagram of decoder 64 having a codeword field extraction unit 110 which receives a sequence of codewords from local display buffer 58 to reconstruct the stream of pixel values for an image. The output of codeword field extraction unit 110 is also fed into a third MUX 102, which is used to select between DEFAULT PRR0 and the output of codeword field extraction unit 110. DEFAULT PRR0 is selected before the codeword containing the first run of a line appears at the input of codeword field extraction unit 110.

The output of third MUX 102, which is the selection between DEFAULT PRR0 and the output of codeword field extraction unit 110, is fed into PRR0 latch 104. PRR0 latch 104 is loaded with the output of third MUX 102 when it receives a load (LD) signal from codeword field extraction unit 110. As discussed below, the LD command is based on codeword field extraction unit 110 encountering an end of run. Thus, the LD command can also be referred to as an END_OF_RUN signal.

Codeword field extraction unit 110 also receives an output from a PRR1 latch 108, which contains the pixel value for the run before the previous run. PRR1 latch 108 will load the value output from a fourth MUX 106 when it receives a load (LD, or END_OF_RUN) signal from codeword field extraction unit 110.

As with encoder 56, decoder 64 will require PRR0 latch 104 and PRR1 latch 108 to be loaded with the values of DEFAULT PRR0 and DEFAULT PRR1, respectively, based on the timing of reaching a new pixel line. The values of DEFAULT PRR0 and DEFAULT PRR1 can either be hard-coded or, if the values are generated during encoding by encoder 56, customized for each image. In the operation of decoder 64, PRR0 latch 104 and PRR1 latch 108 will be loaded with these default values when the codeword containing the first pixel of a line arrives. In one embodiment, third MUX 102 and fourth MUX 106 is set to select the values of DEFAULT PRR0 and DEFAULT PRR1, respectively, before PRR0 latch 104 and PRR1 latch 108 each receives a LD command from codeword field extraction unit 110, all before the codeword containing the first pixel value of the next line is encountered by codeword field extraction unit 110.

Codeword field extraction unit 110 also supplies a COUNT value to count-field counter 112, which keeps track of the current count of the current run. Count-field counter 112 is loaded with the COUNT value when codeword field extraction unit 110 asserts a LD_RUN_LENGTH signal to count-field counter 112. The COUNT value is extracted from the current codeword by codeword field extraction.

Count-field counter 112 generates a END_OF_RUN signal to codeword field extraction unit 110 when the count in count-field counter 112 reaches a predetermined value. In one embodiment, count-field counter 112 is a count-down counter, and the pre-determined value is zero. In another embodiment, count-field counter 112 is a count-up counter, and will generate the END_OF_RUN signal when the count reaches the PIX-COUNT value received from codeword field extraction unit 110.

Count-field counter 112 also generates a LOAD_NEXT_CODEWORD command to local display buffer 58 which causes local display buffer 58 to send the next codeword to be decoded to codeword field extraction unit 110.

Figure 6:
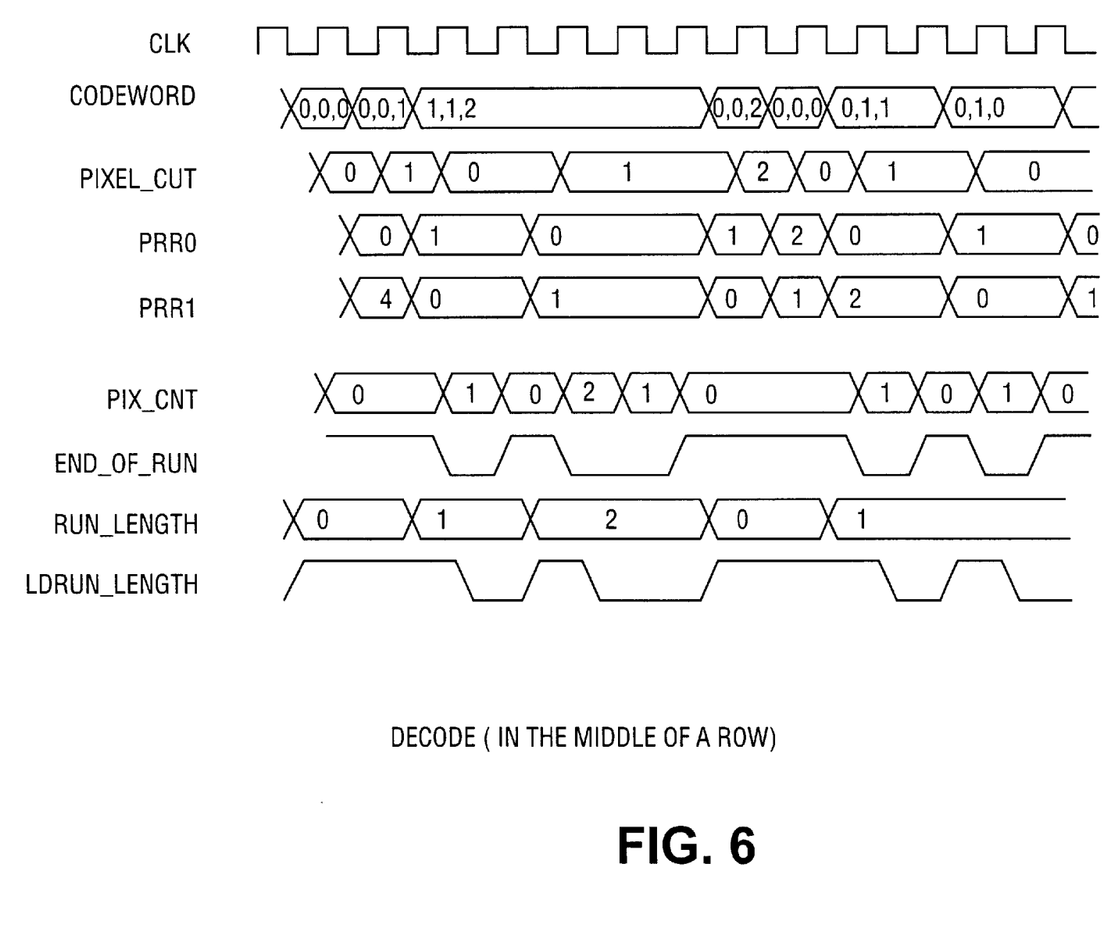
FIG. 6 is a timing diagram of the decoding process of an image according to one embodiment of the present invention during the decoding of a set of codewords for the middle of a row of the image.

FIG. 6 is a timing diagram of the operation of decoder 64 during the decoding of a set of codewords containing pixel values from the middle of a row of an image. The codewords consist of:

. . . (0,0,0); (0,0,1); (1,1,2); (0,0,2); (0,0,0); (0,1,1); (0,1,0) . . .

The codewords received from local display buffer 58 is what was encoded by codeword generator 76. For example, the first codeword (0,0,0) is a codeword of type 0 (the first "0" in the codeword), indicating a run of length 1 (the second "0" in the codeword) with a pixel value of "0" (the third "0" in the codeword). In addition, the second codeword (0,0,1) is a codeword of type 0 (the first "0" in the codeword), indicating a run of length 1 (the second "0" in the codeword) with a pixel value of "1" (the first "1" in the codeword). Also, the third codeword (1,1,2) is a codeword of type 1 (the first "1" in the codeword), indicating a run of length 2 (the second "1" in the codeword) for the pixel value of "0" and a run of length 3 (the first "2" in the codeword) for the pixel value of "1".

As indicated in FIG. 6, PRR0 latch 104 and PRR1 latch 108 loads the output of third MUX 102 and fourth MUX 106, respectively, when the END_OF_RUN signal is asserted by codeword field extraction unit 110. END_OF_RUN signal is used to signal the end of the current run.

RUN_LENGTH is the run length of the current run. For example for the first and second codewords, the value of the RUN_LENGTH signal is "0", indicating that the run length is of length 1. For the third codeword, which contains the run lengths of the third and fourth runs, the RUN_LENGTH signal is "1" and "2", respectively.

PIX_CNT is the number of pixels left in the run after the current pixel. Thus, for example, for the third run, where there is a run of 2 for the pixel value of "0", PIX_CNT has a value of "1" while the first pixel of the third run is being output (indicating that there is one pixel left in the current run), and a value of "0" while the second pixel of the second run is being output (indicating that there are zero pixels left in the current run). For the fourth run, PIX_CNT would begin at "2", decrease to "1" and finally decrease to "0".

LD_RUN_LENGTH, when asserted by codeword field extraction unit 110, causes count-field counter 112 to load the value of RUN_LENGTH. When LD_RUN_LENGTH is not asserted, the value in count-field counter 112 is decreased as discussed above.

PIXEL_OUT is the pixel values which are generated by codeword field extraction unit 110. For example, the stream of pixel values shown in FIG. 6 consist of:

. . . 0,1,0,0,1,1,1,2,0,1,1,0,0 . . .

Figure 7:
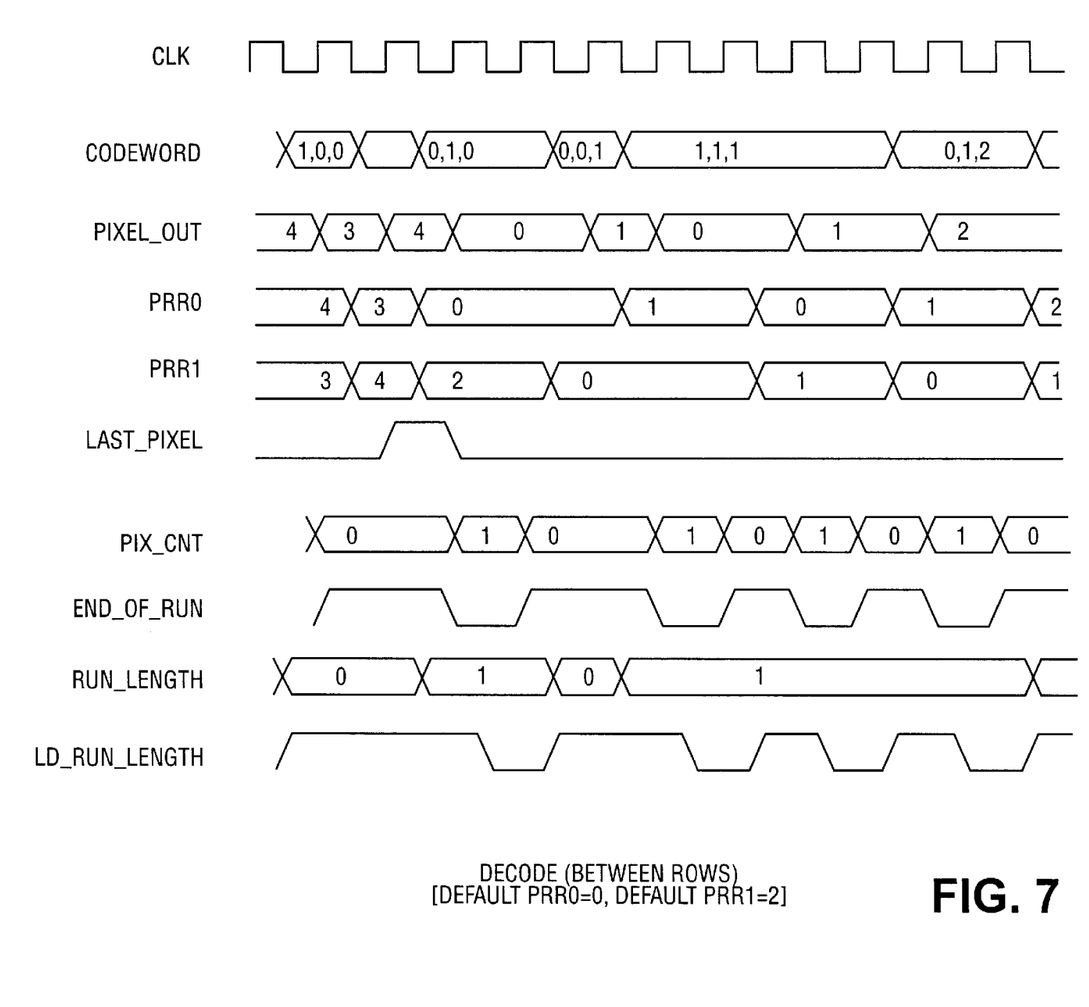
FIG. 7 is a timing diagram of the decoding process of an image according to one embodiment of the present invention when a beginning of a row is encountered.

FIG. 7 is a timing diagram of the operation of decoder 64 during the decoding of a set of codewords containing the pixel values during the transition of the first and second rows of an image. The codewords consist of:

. . . (1,0,0) <end of row> (0,1,0); (0,0,1); (1,1,1); (0,1,2) . . .

where the codeword (1,0,0) is the last codeword in the first row, and the codeword (0,1,0) is the first codeword in the second row.

An additional signal is shown in FIG. 7 is LAST_PIXEL, which, when asserted, indicates that the current pixel on PIXEL_OUT is the last pixel of the current row. As discussed above, third MUX 102 and fourth MUX 106 receives the values of DEFAULT PRR0 and DEFAULT PRR1, respectively, as inputs, when LAST_PIXEL is asserted. Thus, PRR0 latch 104 and PRR1 latch 108 loads DEFAULT PRR0 and DEFAULT PRR1, respectively, as END_OF_RUN and LAST_PIXEL are asserted.

DEFAULT PRR0 and DEFAULT PRR1 are loaded into PRR0 latch 104 and PRR1 latch 108, respectively, to allow the system to start with default values which will increase the number of type 1 codewords in the processed data stream. In a preferred embodiment, values of DEFAULT PRR0 and DEFAULT PRR1 are set to what is predicted to be the commonly encountered pixel values on the edges of the images. This is to increase the likelihood that a type 1 codeword can be used as the system encounters more two-color regions which can be encoded using this scheme.

In another embodiment, the values of DEFAULT PRR0 and DEFAULT PRR1 are pre-determined for all images, and is chosen based on an analysis of the images which are most likely to be encountered.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method comprising:
   receiving a sequence of color values for pixel locations including a first pixel color value, a second pixel color value, and a third pixel color value;
   comparing a current pixel color value with said third pixel color value, said current pixel color value being received sequentially after said third pixel color value;
   comparing said third pixel color value with said first pixel color value;
   if said current color pixel value is not equal to said third color pixel value, then capturing a run length and a run color value; and,
   if said third color pixel value is equal to said first color pixel value, then generating a codeword with a run length and a run color value.

2. The method of claim 1, wherein if said current color pixel value is equal to said third color pixel value, then resetting a run length counter.

3. The method of claim 1, wherein if said current color pixel value is equal to said third color pixel value, then incrementing a run length counter.

4. The method of claim 1, wherein said run color value is equal to said third color pixel value.

5. The method of claim 1, wherein said first color pixel value is received before said second color pixel value, and said second color pixel value is received before said third color pixel value.

6. An apparatus comprising:
   a processor;
   a memory coupled to said processor and configured to cause processor:
      receive a sequence of color values for pixel locations including a first color pixel value, a second color pixel value, and a third color pixel value;
      compare a current color pixel value with said third color pixel value, said current color pixel value being received sequentially after said third color pixel value;
      compare said third color pixel value with said first color pixel value;
      if said current color pixel value is not equal to said third color pixel value, then capture a run length and a run color value; and,
      if said third color pixel value is equal to said first color pixel value, then generate a codeword with a run length and a run color value.

7. The apparatus of claim 6, wherein if said current color pixel value is equal to said third color pixel value, then said memory is configured to cause said processor to reset a run length counter.

8. The apparatus of claim 6, wherein if said current color pixel value is equal to said third color pixel value, then said memory is configured to cause said processor to increment said run length counter.

9. The apparatus of claim 6, wherein said run color value is equal to said third color pixel value.

10. The apparatus of claim 6, wherein said first color pixel value is received before said second color pixel value, and said second color pixel value is received before said third color pixel value.

* * * * *